(12) United States Patent
Dong

(10) Patent No.: US 9,531,954 B2
(45) Date of Patent: Dec. 27, 2016

(54) LENS ARRAY DEVICE

(71) Applicant: Leping Dong, Shenzhen (CN)

(72) Inventor: Leping Dong, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 14/551,446

(22) Filed: Nov. 24, 2014

(65) Prior Publication Data

US 2015/0201128 A1 Jul. 16, 2015

(30) Foreign Application Priority Data

Jan. 10, 2014 (CN) .................... 2014 2 0016650 U

(51) Int. Cl.
*H04N 5/232* (2006.01)
*G02B 27/64* (2006.01)
*H04N 5/225* (2006.01)

(52) U.S. Cl.
CPC ........ *H04N 5/23287* (2013.01); *G02B 27/646* (2013.01); *H04N 5/2253* (2013.01); *H04N 5/2254* (2013.01); *H04N 5/2257* (2013.01)

(58) Field of Classification Search
None
See application file for complete search history.

(56) References Cited

U.S. PATENT DOCUMENTS

| 7,742,691 | B2* | 6/2010 | Takahashi | G02B 27/646 396/55 |
| 2010/0166410 | A1* | 7/2010 | Chang | G03B 35/00 396/326 |
| 2014/0009631 | A1* | 1/2014 | Topliss | G02B 27/646 348/208.11 |
| 2014/0192260 | A1* | 7/2014 | Oh | H04N 5/2251 348/374 |
| 2014/0355118 | A1* | 12/2014 | Park | G02B 27/646 359/557 |

* cited by examiner

*Primary Examiner* — Roberto Velez
*Assistant Examiner* — Yih-Sien Kao
(74) *Attorney, Agent, or Firm* — Na Xu; IPro, PLLC

(57) ABSTRACT

Disclosed is a lens array device. The device includes a base, a holder for retaining the lenses disposed above the base, a first OIS unit for driving the holder to move in a first direction orthogonal to the optical axis direction and a second OIS unit for driving the holder to move in a second direction orthogonal to the optical axis direction. The shake of the frame will be corrected by the electromagnetic force generated by the magnet units and the OIS coils as soon as the position detecting units detecting the shake of the holder in the direction orthogonal to the optical axis direction.

7 Claims, 2 Drawing Sheets

LENS ARRAY DEVICE

FIELD OF THE INVENTION

The disclosure described herein relates generally to lens devices, and more particularly, to a lens array device having OIS (Optical Image Stabilization) function.

DESCRIPTION OF RELATED ART

With the development of camera, lens array devices are widely used in kinds of portable devices, like mobile phone, camera, laptop and so on.

Related lens array device comprises a base, a frame connecting with the base, a plurality of lenses retained on the frame, a circuit board, a plurality of image sensors electrically connecting with the circuit board and a filter disposed between the lenses and the image sensors. The image sensors are retained on the base and corresponding to the lenses.

Under some special usage conditions, the lens device will swing with the portable device and the shake inevitably happens. However, the related array device used in traditional portable device hasn't the ability of anti-shake which lowers the imaging quality of the pictures picked up by the lens array device.

Therefore, an improved lens array device is provided in the present disclosure to solve the problem mentioned above.

Figure 1:
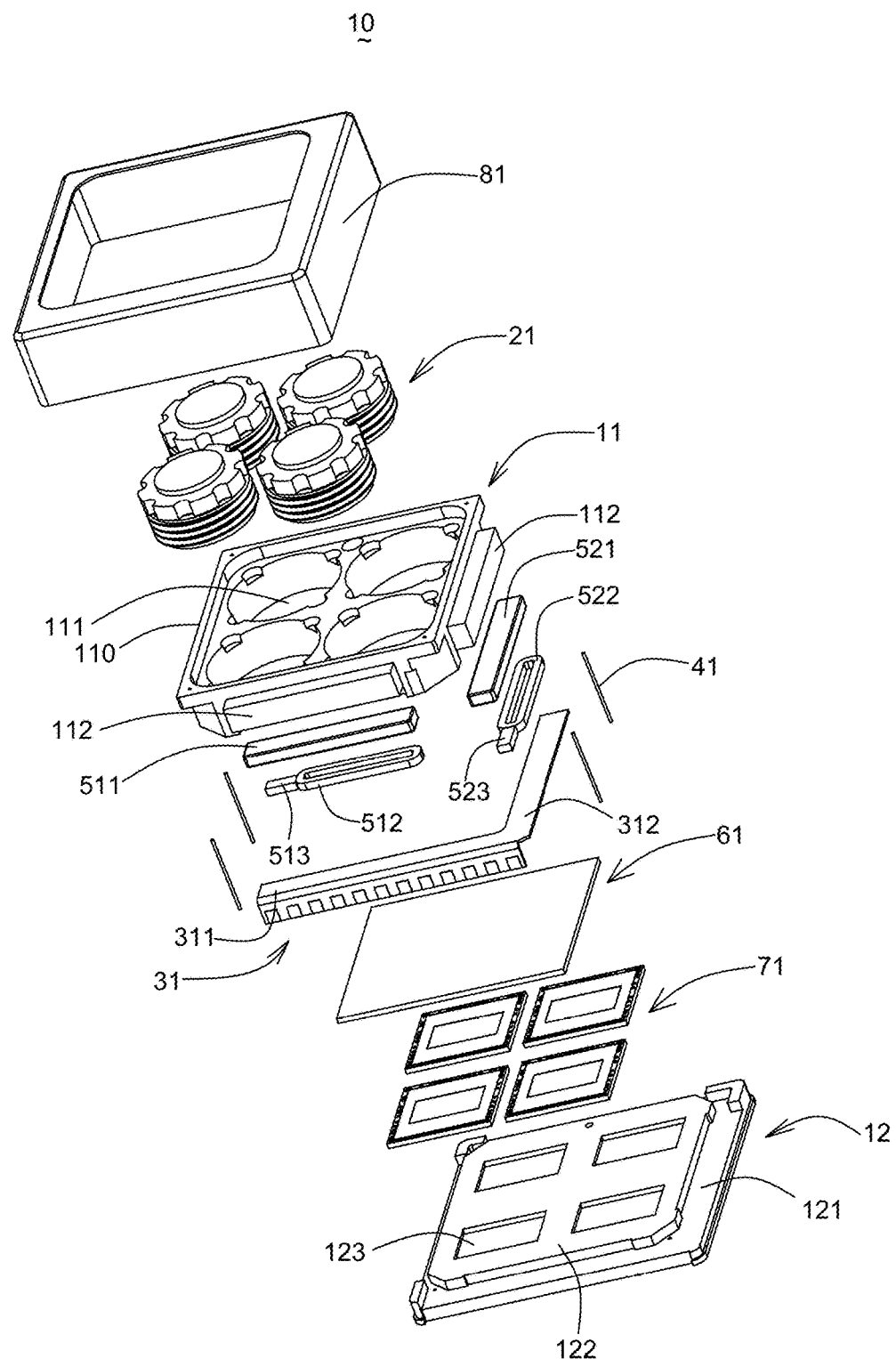
FIG. 1 illustrates an exploded view of a lens array device in according with the exemplary embodiment of the present disclosure.

Many aspects of the embodiment can be better understood with reference to the drawings mentioned above. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

Reference will now be made to describe the exemplary embodiment of the present invention in detail.

Figure 2:
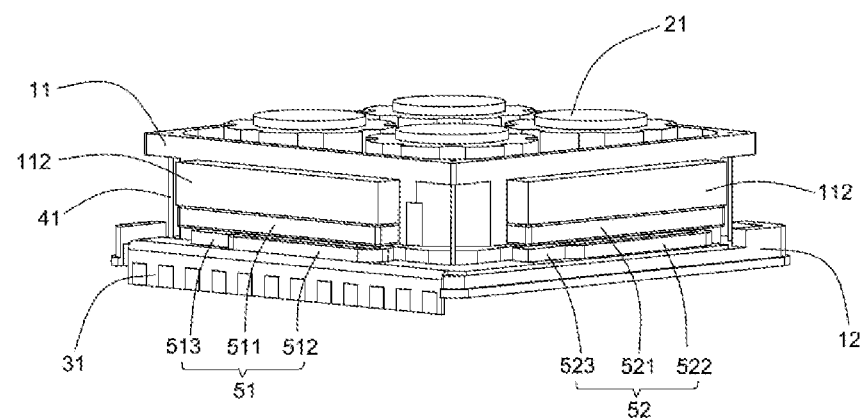
FIG. 2 illustrates an isometric view of the lens array device with a cover thereof being removed away.

Referring to FIGS. 1-2, the present disclosure provides a lens array device 10 comprising a frame assembly, an optical assembly disposed in the frame assembly, a circuit board disposed in the frame assembly and an OIS (Optical Image Stabilization) assembly electrically connecting with the circuit board for anti-shake.

The optical assembly comprises a plurality of lenses 21 respectively disposed in the lens retaining portions 111, a plurality of image sensors 71 respectively disposed in the sensor retaining portions 121, and a filter 61 disposed between the lenses 21 and the image sensors 71 for covering the image sensors 71. Each of the lens 21 has an optical axis and all the optical axes are parallel. The lens 21 image a view of the scene directly on to the corresponding image sensor 71. In this embodiment, the amount of the lenses is four, and the four lenses are arranged in two rows and two columns Correspondingly, the amounts of the image sensors, the lens retaining portions and the sensor retaining portions are also four. The image sensor 71 is a semiconductor, such as a CCD (Charge Coupled Device) image sensor or a CMOS (Complementary Metal Oxide Semiconductor) image sensor.

The frame assembly comprises a base 12, a cover 81 connecting with the base 12 for forming a shell, a holder 11 disposed in the shell and provided above the base 12, and at least one connecting unit 41 for connecting the base 12 and the holder 11. One end of the connecting unit 41 connects with the base 12 and the other end of the connecting unit 41 connects with the holder 11, by which the holder 11 is elastically supported above the base 12 by the connecting unit 41 and kept a distance from the base 12. The connecting unit 41 may be an elastic rod or a wire, or other component that is capable of providing elastic supporting force. The holder 11 is capable of swinging with the deformation of the connecting unit 41 in a direction orthogonal to the optical axis direction. The holder 11 has a main body 110 having an outer peripheral, a plurality of lens retaining portions 111 formed in the main body 110 and an installation portion 112 extending from the outer peripheral of the main body 110. The base 12 has an upper surface 121 towards the holder 11, a platform 122 extending from the center of the upper surface 121 towards the holder 11 and a plurality of sensor retaining portions 123 formed in the platform 122. The plurality of the sensor retaining portions 123 correspond to the lens retaining portions 111, respectively.

The circuit board 31 includes a first circuit portion 311, and a second circuit portion 312 extending from the first circuit portion 311 along a direction perpendicular to the first circuit portion 311. The circuit board 31 is engaged with the platform 122 and fixed on the upper surface 121 of the base 12.

The OIS assembly comprises a first OIS unit 51 for driving the holder 11 to move in a first direction orthogonal to the optical axis direction and a second OIS unit 52 for driving the holder 11 to move in a second direction orthogonal to the optical axis direction. In this embodiment, the first direction is perpendicular to the second direction.

Figure 3:
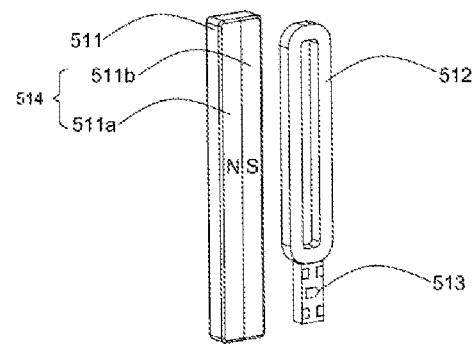
FIG. 3 is an isometric assembled view of a first driving unit of the lens array device of the exemplary embodiment of the present disclosure.

The first OIS unit 51 includes a first OIS coil 512 disposed on the first circuit portion 311 and electrically connecting with the circuit board 31, a first position detecting unit 513 disposed on the first circuit portion 311 and electrically connecting with the circuit board 31, and a first magnet unit 511 disposed on the surface of the installation portion 112 opposite to the first OIS coil 512. Referring to FIG. 3, the first magnet unit 511 is divided into a first portion 511a and a second portion 511b along the length direction of the first magnet unit 511. The first portion 511a and the second portion 511b both have a magnetized direction parallel to the optical axis direction and the first portion 511a and the second portion 511b are magnetized such that the respective magnetic poles differ from each other. For example, the first portion 511a is magnetized into N-pole while the second portion 511b is magnetized into S-pole. Or, the first portion 511a is magnetized into S-pole while the second portion 511b is magnetized into N-pole. When the first OIS coil 512 is electrified, the direction of the electromagnetic force generated by the first OIS coil 512 interacting with the first magnet unit 511 is orthogonal to the optical axis direction, that is, the direction of the force applied on the first magnet unit 511 is orthogonal to the optical axis direction and the holder 11 will move in the same direction with the first magnet unit 511 because the first magnet unit 511 is fixed on the holder 11.

The first position detecting unit 513 is used for detecting a front movement of the holder 11 along the first direction and generating a first position signal. The first position detecting unit 513 is optionally a hall element. The first position signal is transmitted to the circuit board 31 and the circuit board 31 transfers the first position signal into a first electrical signal and send the first electrical signal to the first OIS coil 512. The holder 11 will be driven to move back along the first direction by the electromagnetic force generated by the first magnet unit 511 interacting with the first OIS coil 512. Furthermore, the front movement is reversed with the back movement.

The second OIS unit 52 includes a second OIS coil 522 disposed on the second circuit portion 312 and electrically connecting with the circuit board 31, a second position detecting unit 523 disposed on the second circuit portion 312 and electrically connecting with the circuit board 31 and a second magnet unit 521 disposed on the surface of the installation portion 112 opposite to the second OIS coil 522. Substantially the same with the first OIS unit 51, the second magnet unit 521 is also divided into two portions along the length direction of the second magnet unit 521. The two portions have a magnetized direction parallel to the optical axis direction and the two portions are magnetized such that the respective magnetic poles differ from each other. For example, one is magnetized into N-pole while the other is magnetized into S-pole. Or, one is magnetized into S-pole while the other is magnetized into N-pole.

The second position detecting unit 523 is used for detecting the movement of the holder 11 in the second direction and generating a second position signal. The first position detecting unit 523 is preferably a hall element. The second position signal is transmitted to the circuit board 31 and the circuit board 31 transfers the second position signal into a second electrical signal. The second electrical signal is transmitted to the second OIS coil 522 and the holder 11 will be driven to move back in the second direction by the electromagnetic force generated by the second magnet unit 521 interacting with the second OIS coil 522.

The shake of the frame will be corrected by the electromagnetic force generated by the magnet units and the OIS coils as soon as the position detecting units detecting the shake of the frame in the direction orthogonal to the optical axis direction.

While the present disclosure has been described with reference to the specific embodiment, the description of the disclosure is illustrative and is not to be construed as limiting the disclosure. Various of modifications to the present disclosure can be made to the exemplary embodiment by those skilled in the art without departing from the true spirit and scope of the disclosure as defined by the appended claims.

What is claimed is:

1. A lens array device, comprising:
   a base having a plurality of sensor retaining portions;
   at least one connecting unit for providing elastic supporting force;
   a holder having a plurality of lens retaining portions corresponding to the sensor retaining portions, the holder being supported by the connecting unit in such a manner that the holder is capable of swinging with the deformation of the connecting unit in a direction orthogonal to an optical axis of the lens array device;
   a circuit board;
   a plurality of lenses assembled in the lens retaining portions, respectively;
   a plurality of image sensors received in the sensor retaining portions, respectively;
   a first optical image stabilization unit comprising a first optical image stabilization coil electrically connecting with the circuit board, a first position detecting unit electrically connecting with the circuit board, and a first magnet unit disposed on the holder and opposite to the first optical image stabilization coil for interacting with the first optical image stabilization coil for driving the holder to move in a first direction orthogonal to the optical axis; a first surface opposite to the first optical image stabilization coil of the first magnet unit being divided into two portions along a length direction of the first magnet unit, and the two portions being magnetized such that the respective magnetic poles differ from each other; a second optical image stabilization unit comprising a second optical image stabilization coil electrically connecting with the circuit board, a second position detecting unit electrically connecting with the circuit board, and a second magnet unit disposed on the holder and opposite to the second optical image stabilization coil for interacting with the second optical image stabilization coil for driving the holder to move in a second direction orthogonal to the optical axis; a second surface opposite to the second optical image stabilization coil of the second magnet unit being divided into two portions along a length direction of the second magnet unit, and the two portions being magnetized such that the respective magnetic poles differ from each other.

2. The lens array devices as described in claim 1, wherein the holder further comprises a main body having an outer peripheral and an installation portion extending from the outer peripheral of the main body, the plurality of lens retaining portions are formed in the main body, the first magnet unit and the second magnet unit are disposed on the surface of the installation portion opposite to the base.

3. The lens array device as described in claim 1, wherein the first direction is perpendicular to the second direction.

4. The lens array device as described in claim 1 further comprising a cover engaging with the base.

5. The lens array device as described in claim 1 further comprising a filter disposed between the lenses and the image sensors for covering the image sensors.

6. The lens array devices as described in claim 1, wherein the base further comprises an upper surface towards the holder and a platform extending from the center of the upper surface toward the holder, the plurality of sensor retaining portions are formed in the platform, the circuit board comprises a first circuit portion, and a second circuit portion extending from the first circuit portion along a direction perpendicular to the first circuit portion, the circuit board is engaged with the platform and fixed on the upper surface of the base.

7. The lens array devices as described in claim 6, wherein the first optical image stabilization coil and the first position detecting unit are disposed on the first circuit portion and electrically connecting with the circuit board, the second optical image stabilization coil and the second position detecting unit are disposed on the second circuit portion and electrically connecting with the circuit board.

* * * * *